BARRY L. TARMY
JOSEPH A. SHROPSHIRE   Inventors
ANDREAS W. MOERIKOFER

By W. O. T Heilman

Patent Attorney

BARRY L. TARMY
JOSEPH A. SHROPSHIRE    Inventors
ANDREAS W. MOERIKOFER

Patent Attorney 3,350,227
METHOD OF REGENERATING NITRIC ACID OXIDANT OF FUEL CELL
Andreas W. Moerikofer, Fanwood, Joseph A. Shropshire, Westfield, and Barry L. Tarmy, Berkeley Heights, N.J., assignors to Esso Research and Engineering Company, a corporation of Delaware
Filed Sept. 14, 1962, Ser. No. 223,728
3 Claims. (Cl. 136—86)

This invention relates to a process of oxidation comprising intimately contacting a gaseous substance with a gaseous oxidant. In particular, this invention relates to a novel fuel cell and to a process for the operation of a fuel cell wherein a combustible fuel is anodically oxidized, nitric acid or a partial reduction product thereof is cathodically reduced and the reduction products of such acid chemically regenerated. More particularly, this invention relates to the regeneration of nitric acid from electrochemical reduction products thereof with oxygen and to the employment of a foaming agent in such regeneration.

The term "fuel cell" is used herein and in the art to denote a device, system or apparatus wherein chemical energy of a combustible fuel is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode, respectively, which are separated by an electrolye which provides ionic conductance therebetween, conduction means for electrical connection between such anode and cathode external to such electrolyte, means for admitting a fluid fuel into dual contact with the anode and electrolyte and means for admitting a fluid oxidant into dual contact with the cathode and electrolyte. Where necessary or desired, the electrolyte compartment is divided into an anolyte compartment and a catholyte compartment by an ion-permeable partition or ion-exchange membrane. In certain embodiments two or more of such partitions may be employed to further subdivide the electrolyte compartment, e.g. as where a central electrolyte compartment is provided between electrodes and the aforementioned anolyte and catholyte compartments are positioned on the opposite sides of the respective electrodes. Thus, in each such cell, hydrogen, a hydrogen containing gas, e.g. $NH_3$, $N_2H_4$, or a fluid organic fuel is electrochemically oxidized at the anode with a release of electrons to such anode and an oxidant is electrochemically reduced at the cathode upon receiving electrons from such cathode.

With respect to the reduction of oxidant in the cathodic half-cell, fuel cells can be divided into two general types. In this division, the first group would then include those cells wherein the direct or primary oxidant is free oxygen admitted to the catholyte as oxygen gas, air, hydrogen peroxide, etc., and is electrochemically reduced at the cathode. The second group includes the cells of this invention, i.e. cells wherein the direct or primary oxidant comprises an oxygen containing compound which is electrochemically reduced at the cathode and subsequently chemically regenerated by a secondary oxidant which may be one or more of the conventional oxidants of the first group. This invention is concerned with those cells of the aforementioned second group wherein the primary oxidant employed is nitric acid or a partial reduction product thereof and wherein the reduction products of such primary oxidant are chemically reoxidized with free oxygen gas to regenerate nitric acid or a reducible reduction product thereof. The term "free oxygen gas" is used to designate a gas wherein oxygen is present which is not chemically combined with another element, e.g. oxygen in air.

It has now been discovered that the regeneration of nitric acid from its gaseous reduction products is greatly facilitated if a foam-forming agent is employed in conjunction with an electrolyte solution which such reduction products must contact before leaving the system. The foam-forming agents used in this invention are also known to the art as surface active agents, i.e. surfactants.

The electrochemical reduction of the primary oxidant at the cathode can be expressed by the following overall equation:

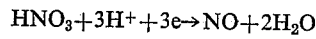
$$HNO_3 + 3H^+ + 3e \rightarrow NO + 2H_2O$$

Economical operation of such a cell requires that the NO be regenerated to nitric acid for reuse at the cathode and that the loss of nitric acid reduction products with escaping secondary oxidant be minimized.

The regeneration of nitric acid or a reducible reduction product thereof is surprisingly increased and hence the loss of NO gas greatly reduced if a suitable foam-forming agent is employed in combination with electrolyte and free oxygen, e.g. air, in the process of chemical regeneration.

In accordance with this invention the regeneration step may be carried out either inside or outside the cell proper. As aforementioned, the reactivation of the primary oxidant is effected by bringing the NO gas formed at the cathode into intimate contact with oxygen gas and hence into intimate contact with the acidic electrolyte. For maximum efficiency it is necessary that the NO gas be retained in intimate contact with oxygen gas of sufficient quantity and for a sufficient time to convert NO to $NO_2$ and that the latter be maintained in intimate contact with the aqueous acidic electrolyte for a time sufficient to convert the same to a reaction product which is a liquid under the conditions of operation. We have found that a reoxidation of NO to $NO_2$ with air or oxygen gas is greatly accelerated by making such contact in gaseous phase. This is greatly facilitated by providing a foaming medium for such regeneration.

The foaming agents employed in accordance with this invention are water soluble. They are preferably relatively inert to electrochemical reduction when in contact with the cathode. The foaming properties of such compounds should be relatively unaffected by the presence of oxygenated hydrocarbons, e.g. alcohols. Preferably they have relatively high cloud point temperatures, and are relatively stable in strong sulfuric acid at the temperatures of cell operation. Such compounds preferably provide a stable foam with relatively small bubbles which foam is collapsible under certain desirable conditions.

Surface active agents, hereinafter sometimes referred to as surfactants, that may be advantageously employed in accordance with this invention include nonionic surfactants including, by way of example, adducts of ethylene oxide or propylene oxide and high molecular weight fatty alcohols, alkyl phenols or dialkylphenols; including also polyoxyethylene polyoxypropylene polyoxyethylene ethanols; including also fluorinated hydrocarbons. Anionic surfactants that may be advantageously employed include, by way of example, alkyl substituted diphenyl ether sulfonates; they also include phosphate esters of the aforementioned adducts of ethylene oxides and fatty alcohols; they also include fluorinated hydrocarbons with anionic groups and also include alkyl-benzene sulfonates.

Classes of surface active agents hereinbefore described include types of compounds such as: Nonionic surfactants as by way of example: adducts of ethylene oxide or propylene oxide and high molecular weight fatty alcohols or alkyl phenols or dialkyl phenols. The general formula is $R—O—[(CH_2)_m—O]—_nH$, where R represents a fatty alcohol, an alkyl phenol or a dialkyl phenol, $m$ is 2 or 3 and $n$ is a number between 1 and 30. The fatty alcohol groups may have from 1 to 30 carbon atoms per molecule, preferably from 8 to 16. The alkyl phenol groups may have from 7 to 30 carbon atoms, preferably from 13 to 22. The dialkyl phenol groups may have from 8 to 44 carbon atoms, preferably from 18 to 30. The number of ethylene oxide or propylene oxide units ($n$) per molecule may vary between 1 and 30. The number $n$ is preferably between 4 and 15 in the adduct with fatty alcohols, between 10 and 20 in the adduct with alkyl phenol and between 15 and 30 in the adduct with dialkyl phenols. These surfactants can be further characterized by the ratio between the hydrophilic and the lipophilic part of the molecule. This ratio is called the "Hydrophilic-Lipophilic Balance" or HLB-number and is calculated in case of these nonionic surfactants by dividing by five the amount of wt. percent of ethylene oxide in the molecule. This HLB-number will range from about 9 to about 16 in the adducts with fatty alcohols and from about 13 to 17 in the adducts with alkyl and dialkyl phenols.

Other hereinbefore described nonionic surfactants are hydroxyl polyoxyethylene polyoxypropylene polyoxyethylene ethanol with the formula $$HO-(CH_2CH_2O)_x-(CH_2CH_2CH_2O)_y-(CH_2CH_2O)_z-CH_2CH_2OH$$

The total number of ethylene oxide units ($x+z$) is between about 3 to 45, preferably from 29 to 45. Corresponding HLB-values range from about 10 to 16. The number $y$ of propylene oxide units may vary from about 20 to 43, preferably from 30 to 43. Another class of foam forming nonionic surfactants are fluorinated hydrocarbons with a hydrophilic organic or inorganic group.

Also within the scope of this invention are anionic surfactants including by way of example: alkyl phenyl sulfonates

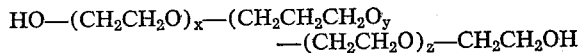

wherein the alkyl group R can have from 1 to 18 carbon atoms; mono and diphosphate esters of the aforementioned adducts of ethylene oxide and fatty alcohols or alkyl phenols with the general formula

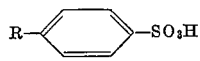

The number of carbon atoms can be from 1 to 30, preferably from 7 to 22 and the number of ethylene oxide units can be from 4 to 30, preferably from 10 to 15. The corresponding HLB-numbers range from about 12 to about 15. Other anionic surfactants of the type of alkyl substituted diphenyl ether sodium disulfonates have the general formula:

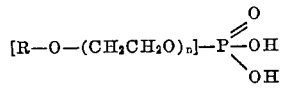

R is an alkyl group with 1 to 15 carbon atoms, preferably between 6 to 12. In some surfactants R' represents hydrogen (monoalkylation), in others it represents partial alkylation (20%) with the same alkyl group as R. Other anionic surfactants are included in this invention wherein the lipophilic portion of the molecule comprises a fluorocarbon and the hydrophilic group is of organic or inorganic nature.

Specific examples of the surface active agents hereinbefore described include compounds such as: Adduct of ethylene oxide and tridecyl alcohol with a mole ratio of 9:1, also called polyoxyethylene ether of tridecyl alcohol, $C_{13}H_{27}O-(CH_2CH_2O)_9-H$; adduct of ethylene oxide and iso-octyl phenol with a mole ratio of 12:1 also called iso-octylphenoxy polyoxyethylene ethanol,

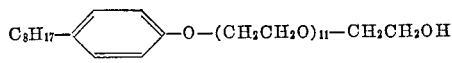

adduct of ethylene oxide and diisooctyl phenol, also called diisooctylphenoxy polyoxyethylene ethanol,

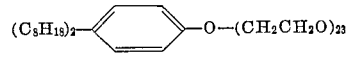

hydroxy polyoxyethylene polyoxypropylene polyoxyethylene ethanol, $$HO-(CH_2CH_2O)_{22}-(CH_2CH_2CH_2O)_{43}-(CH_2CH_2O)_{21}-CH_2CH_2OH$$

sodium dodecyl phenyl sulfonate,

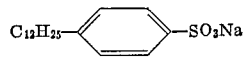

monophosphate ester of polyoxyethylene ether of tridecyl alcohol,

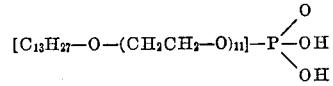

sodium dodecyl oxydibenzene disulfonate,

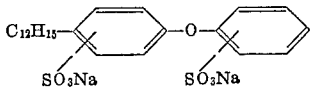

Other foaming agents which are not normally considered to be surfactants, i.e. surface active agents, may also be used by themselves, or, more preferably in conjunction with a surfactant. These include highly carboxylated vanadium or nickel porphyrins, and also high molecular weight polysaccharides, e.g. a microbiological polysaccharide gum derived from glucose, made up of mannose, glucose and a glucuronate salt in the approximate molar ratio of 2:1:1, and one acetyl group per four sugar units.

The foaming agent used in accordance with this invention is employed in a concentration sufficient to provide a stable foam regeneration zone to entrap the NO released at the cathode and hold the same until reoxidation is attained. When introduced directly into the catholyte and subsequently contacted with the secondary oxidant, e.g. air, the concentration of the foaming agent in the catholyte will be maintained in the range of about 0.001 to 10.0 wt. percent, preferably about 0.1 to 2.0 wt. percent. The foaming agent may be introduced continuously or intermittently.

When nitric acid or a reducible reduction product thereof, e.g. $NO_2$, $N_2O_4$ or $HNO_2$, is employed as the primary oxidant the cell ordinarily will be operated with an electrolyte temperature in the range of about 0° F. to 400° F., preferably about 140° F. to 180° F. when operating at atmospheric pressure. The preferred electrolyte is aqueous sulfuric acid which may be employed in the conventional concentrations disclosed in the literature, e.g. about 1.0 to 50.0 wt. percent, preferably about 20.0 to 50.0 wt. percent. In the catholyte the primary oxidant is employed in concentrations of about 0.30 to 6.0 wt. percent, or above, preferably in the range of about 0.7 to 2.0 wt. percent.

The primary oxidant may be introduced to the catholyte in the form of nitric acid, or a reduction product of nitric acid, e.g. $NO_2$, $N_2O_4$, or as a water soluble salt of such, as $NaNO_3$ or $KNO_3$. The use of gaseous $NO_2$ as the main source of primary oxidant supply provides certain advantages over the use of the liquid nitric acid in that once in the cell the $NO_2$ rapidly and efficiently reacts with the water present to form $HNO_3$ and the need for transporting the water content of $HNO_3$ to the cell installation site is eliminated.

The cold start-up of the cell is difficultly effected with $HNO_3$ alone. In cases where external heating is not available for start-up, the addition of small quantities of nitrite salts (e.g. $NaNO_2$, $KNO_2$) to the electrolyte is useful. Upon addition of the salt to the electrolyte the same will decompose in the acid medium to provide $HNO_2$, which is a satisfactory initiator for the reaction. In a preferred embodiment the reaction is initiated by the introduction of gaseous $NO_2$ both as initiator and primary oxidant supply.

The invention will be more easily understood from the accompanying drawings.

Figure 1:
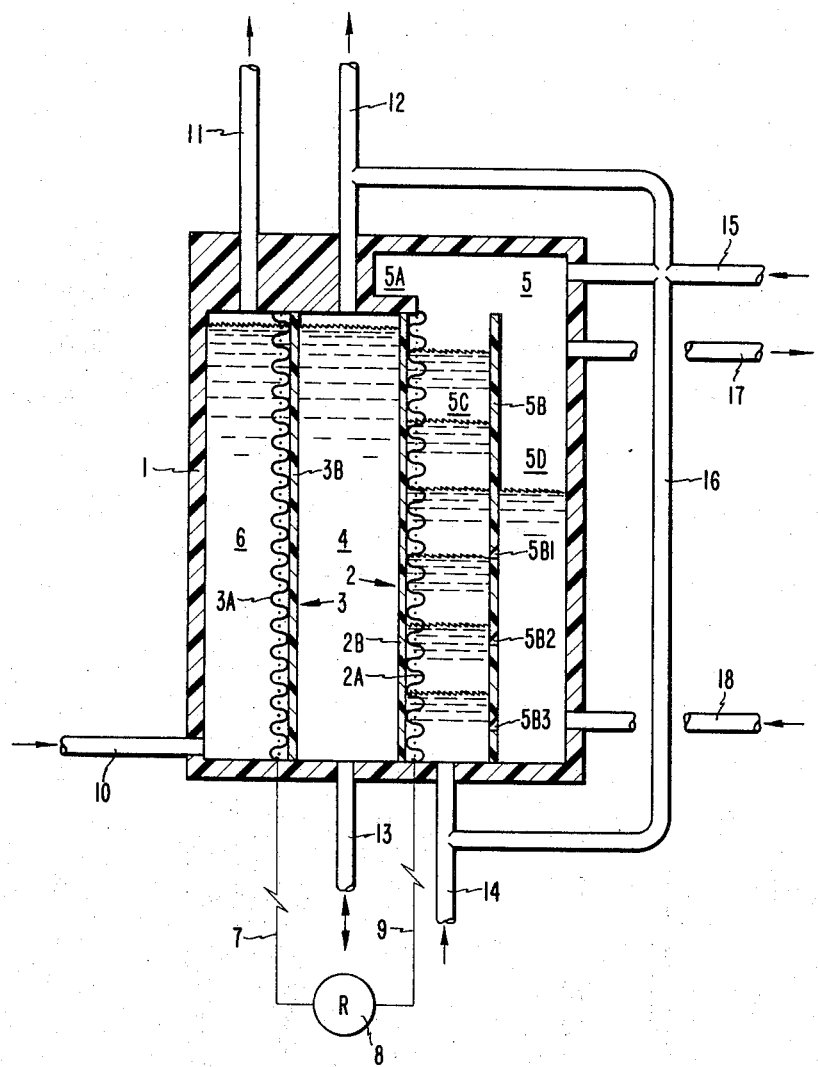
FIGURE 1 is a schematic sideview of a fuel cell adapted for internal regeneration of the primary oxidant in accordance with the process of this invention.

Referring now to FIGURE 1, there is shown a fuel cell container or vessel 1, containing a cathode assembly 2, an anode assembly 3, a central electrolyte compartment 4, a catholyte compartment 5 and an anolyte compartment 6. Cathode assembly 2 and anode assembly 3, each include a wire screen electrode 2A and 3A respectively, surfaces of which are coated with a suitable catalytic material. Such electrode screen members are employed in conjunction with a porous organic membrane. Membranes 2B and 3B respectively, are in contact with the respective screen member and positioned between the respective screen member and central electrolyte compartment 4. Electrodes 2A and 3A are electrically connected via wires 7 and 9 and resistance means 8 which is symbolic of any electrical device or appliance adapted for receiving its power of activation from a direct electric current. Fuel inlet conduit 10 provides means for introducing an electrolyte soluble fuel, e.g. methanol into anolyte compartment 6 which is here shown to be substantially filled with an aqueous sulfuric acid electrolyte. Fuel exhaust conduit 11 provides means for removing carbon dioxide formed at anode 3A in electrochemical oxidation of the fuel. The central electrolyte compartment 4 is shown equipped with conduits 12 and 13 which may be utilized for a variety of purposes. These include providing escape means for any gaseous product formed at either of the electrodes which may escape from their respective compartments through membranes 2B and 3B, providing means for replenishing electrolyte in compartment 4 and to provide means for flushing or cleansing the compartment. In catholyte compartment 5 there is shown a foam regeneration zone 5A comprising the enlarged upper portion of catholyte compartment 5. Below zone 5A compartment 5 is separated by an electrolyte permeable barrier 5B into a cathodic reaction zone 5C and catholyte recycle zone 5D. Catholyte compartment 5 is, in this embodiment, shown communicating with a lower air inlet conduit 14 and an upper air inlet conduit 15. Conduits 12, 14 and 15 are connected by pressure control conduit 16 providing control means for maintaining a balance of pressure in catholyte compartment 5 and central electrolyte compartment 4. Catholyte compartment 5 also communicates with air exhaust conduit 17 providing means of escape for air or other oxidant, e.g. oxidant gas admitted to catholyte compartment 5 via conduits 14 and 15. In a preferred embodiment air is admitted to reaction zone 5C of a catholyte compartment 5 so as to provide a bubbling or slug-like flow of air and electrolyte upward through zone 5C into regeneration zone 5A where additional air is admitted from conduit 15. The electrolyte in catholyte compartment 5 comprises aqueous sulfuric acid, e.g. 30 wt. percent to which the primary oxidant, nitric acid has been added. In the embodiment shown in FIGURE 1 both oxidant and electrolyte may be added to catholyte compartment 5 via inlet conduit 18. As electrolyte, primary oxidant, and air are passed upward through reaction zone 5C the primary oxidant, i.e. $HNO_3$ or a reducible reduction product thereof is electrochemically reduced upon contact with cathode 2A and the ultimate reduction product NO carried as a gas through regeneration zone 5A. The foam producing surfactant may be introduced into catholyte compartment 5 via any of the inlet conduits, e.g. 14, 15 or 18. A stable small-bubble foam is maintained in regeneration zone 5A entrapping the aforementioned NO and oxygen and facilitating the reoxidation thereof to nitric acid as hereinbefore explained. The liquid electrolyte together with the regenerated nitric acid spills over into catholyte recycle zone 5D from whence it reenters reaction zone 5C through one or more openings in barrier 5B. As here shown, barrier 5B has three openings, $5B_1$, $5B_2$ and $5B_3$ in the lower portion thereof for the return flow of electrolyte and primary oxidant to reaction zone 5C. As here shown, these pores or channels diminish in diameter at the end opening into the reaction zone 5C to minimize the escape of air from zone 5C.

Figure 2:
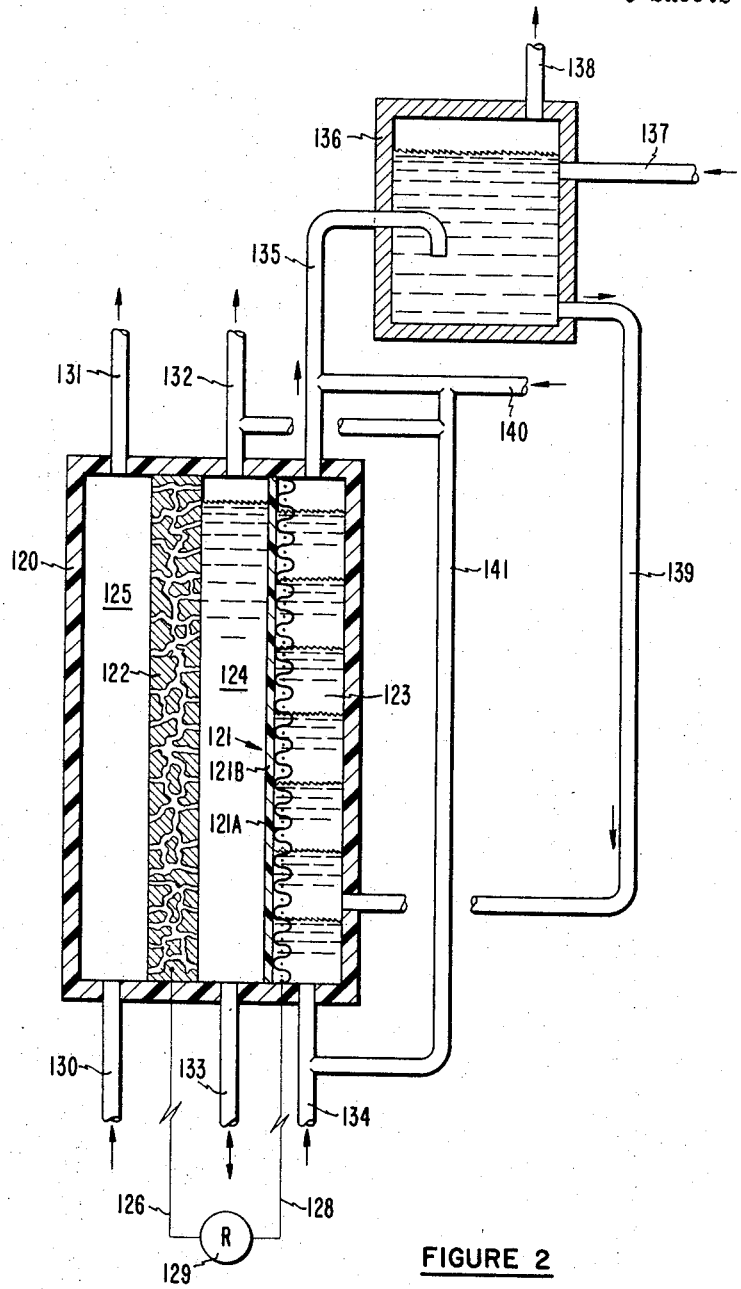
FIGURE 2 is a schematic sideview of a fuel cell assembly adapted for external regeneration of the primary oxidant in accordance with the process of this invention wherein the catholyte and cathodic reduction products are circulated in co-current flow.

Referring now to FIGURE 2 there is shown a fuel cell container or vessel 120 which contains a cathode assembly 121 comprising a wire screen electrode 121A and a porous organic membrane 121B similar or identical to 2A or 2B of FIGURE 1 and a porous carbon anode 122. Cathode 121A and anode 122 are here shown electrically connected by wires 126, 128 and resistance means 129 which serve the same purpose as the external circuit of FIGURE 1, i.e. 7, 8 and 9 of FIGURE 1. Cathode assembly 121 and anode 122 divide the interior of vessel 120 into a catholyte compartment 123, a central electrolyte compartment 124 and a fueling compartment 125. Fuel inlet conduit 130 provides means for passing a gaseous combustible fuel, such as hydrogen gas or a gaseous hydrocarbon, into fueling compartment 125 into the pores of anode 122 through which such fuel gas migrates until it contacts electrolyte from compartment 124 and forms with the anode 122 a three-phase contact. Fuel exhaust conduit 131 provides means for removing unused fuel in compartment 125 and with organic fuels removal of carbon dioxide and/or other gases. Central electrolyte compartment 124 communicates with upper exhaust conduit 132 which is here primarily used to permit the escape of carbon dioxide when an organic fuel is employed and to provide means for maintaining the cell pressure. At or near the bottom of compartment 124 the compartment communicates with conduit 133 which may be used to drain the compartment. Catholyte compartment 123 containing aqueous sulfuric acid electrolyte and the primary oxidant receives a continous flow of air through air inlet conduit 134. Again as in FIGURE 1, it is preferred to control the size of this compartment and the rate of air flow such as to provide a bubbling or slug-like flow of electrolyte and primary oxidant upward through compartment 123 in contact with cathode 121A whereby the primary oxidant is electrochemically reduced at the cathode surface and the resulting reduction products, particularly NO are removed overhead via conduit 135 and thence carried into oxidant regenerator 136 which comprises a tank-like structure adapted to retain a liquid electrolyte, i.e. aqueous sulfuric acid of the concentration used in the cell. Conduit 135 is positioned so as to discharge the aerated stream of electrolyte and nitric acid reduction products below the surface of the sulfuric acid electrolyte shown in vessel 136. Additional air may be admitted to vessel 136 via air inlet conduit 137 or this conduit may be used to admit surfactant to provide the foaming action desired in regeneration. In the alternative, the surfactant may be admitted via air inlet conduit 134 or air inlet conduit 137 with the air stream. Oxidant regeneration vessel 136 is also equipped with an exhaust conduit 138 through which the air stream escapes to the atmosphere. In some embodiments it may be desirable to recycle at least a portion of this stream back to catholyte compartment 123 to further minimize losses of NO. Vessel 136 also communicates near the bottom thereof with recycle conduit 139 through which electrolyte and regenerated nitric acid are returned from vessel 136 to catholyte compartment 123. Optionally, an additional air stream may be admitted into conduit 135 via air inlet conduit 140. Conduits 132, 134 and 140 are here shown to be interconnected by pressure control conduit 141 to facilitate the balance of pressures in the cell.

Figure 3:
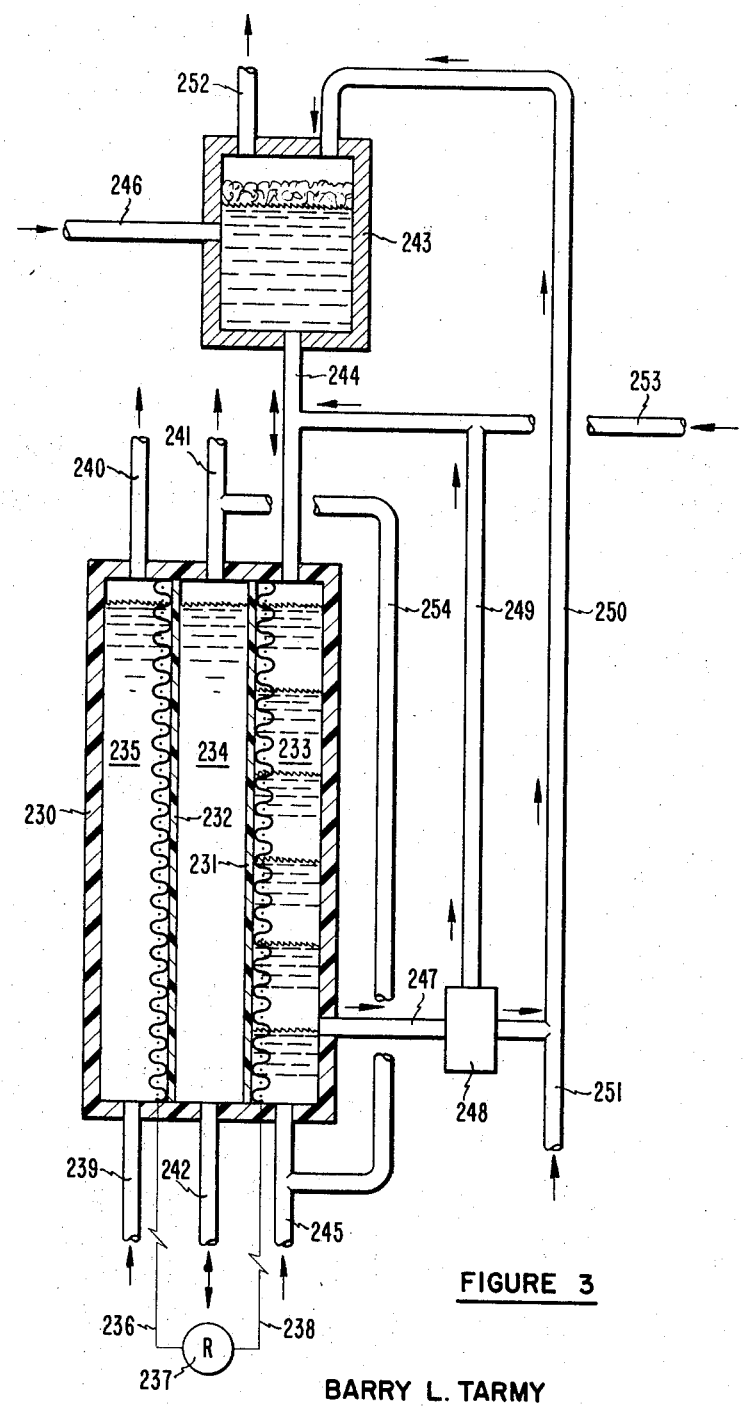
FIGURE 3 is a schematic sideview of a fuel cell assembly adapted for external regeneration of the primary oxidant in accordance with the process of this invention wherein gaseous fluid from the cathodic half cell is contacted countercurrently with electrolyte.

Referring now to FIGURE 3 there is shown a fuel cell container or vessel 230 which contains a cathode assembly 231 and an anode assembly 232 of the same type shown in FIGURE 1. Cathode assembly 231 and anode assembly 232 divide the interior vessel 230 into a catholyte compartment 233, a central electrolyte compartment 234 and an anolyte compartment 235 and are electrically connected by wire 236, resistance means 237 and wire 238. Fuel inlet conduit 239 provides means for introducing an electrolyte soluble fuel into anolyte compartment 235 which is shown containing a liquid electrolyte, e.g. sulfuric acid. Fuel exhaust conduit 240 provides exhaust means for removing carbon dioxide formed at the anode. Central electrolyte compartment 234 communicates with conduits 241 and 242 which serve the same functions as the corresponding conduits in FIGURE 1. Electrolyte compartment 234 also contains the same aqueous electrolyte. Aqueous sulfuric acid electrolyte is continuously admitted to anolyte compartment 233 from oxidant regeneration compartment 243 via conduit 244. The chemical or secondary oxidant, e.g. air, is introduced into catholyte compartment 233 countercurrently to the flow of electrolyte therein via air inlet conduit 245. The upward movement of this air stream through catholyte compartment 233 sweeps with it the gaseous reduction products of the primary oxidant and carries the same through conduit 244 into oxidant regeneration compartment 243 where they are intermixed with the electrolyte therein and a surfactant as hereinbefore described so as to entrap NO gas and reoxidize the same to nitric acid. Oxidant regeneration compartment 243 is operated so as to maintain a stable layer of foam above the liquid electrolyte level therein. To evacuate this, additional air may be introduced into compartment 243 via air inlet conduit 246. To complete the circulation of electrolyte, electrolyte is removed from anolyte compartment 233 at or near the bottom thereof via electrolyte recycle conduit 247 which passes through degassing drum 248 which provides escape means for gaseous reduction products of nitric acid, such as NO and $NO_2$ which escape upward via conduit 249 which communicates with conduit 244 so as to release such products into the main upward gas stream. The liquid electrolyte from degassing drum 248 enters electrolyte recycle conduit 250 through which it is passed to an upper portion of oxidant regeneration compartment 243. The transfer of electrolyte through conduit 250 may be effected by pumping means (not shown here) or the electrolyte may be propelled through conduit 250 by introducing a stream of air into conduit 250 via air inlet conduit 251. Oxidant regeneration compartment 243 has outlet means via conduit 252 for escape of air to the atmosphere. Provision may also be made for recycling the contents of conduit 252 to catholyte compartment 233 to further minimize the loss of NO gas. An inlet conduit 253 which communicates with conduit 249 provides means for introduction of air into the gas stream between the cell proper and the oxidant regeneration zone. The foaming agent may be introduced via conduits 245, 246, 250 or 253. Conduits 241 and 245 are here shown to be interconnected by pressure control conduit 254 to facilitate the equilization of air pressure in compartments 233 and 234.

The following operative examples are illustrative of representative embodiments of the invention and should not be construed as limitations upon the true scope of the invention as set forth in the claims.

EXAMPLE 1

The effect of employing a surface active agent in the regeneration of the primary oxidant upon cell performance was tested in accordance with the methods hereinbefore described. The catholyte employed was 29 wt. percent preelectrolyzed sulfuric acid. The concentration of primary oxidant in this electrolyte calculated as $HNO_3$ was 1 wt. percent. The primary oxidant was introduced to the electrolyte in the form of about 70% nitric acid. An electrolyte temperature of about 180° F. was maintained during the tests and the gas flow rate of the secondary oxidant was maintained at about 30 cc. per minute through the catholyte compartment having a cross sectional area of about 2 square inches. A series of individual tests was carried out, in which a nonionic water soluble adduct of tridecyl alcohol and ethylene oxide having a mole ratio of 1:9 was added to the catholyte in a 1 wt. percent concentration. Controls were also run without the addition of the surfactant. Two different cathodes were employed in these tests. These include a platinum screen upon which platinum black had been electrodeposited on the surface and a porous carbon electrode impregnated with platinum and gold. The secondary oxidant was alternately air and oxygen gas. The results of these tests are set forth in the following table:

EFFECT OF NONIONIC SURFACTANT IN FUEL CELL OXIDANT REGENERATION

| Electrode | Additive | Gas type | Gas flow, cc./min. | Regeneration efficiency: coulombs measured / Coulombs equiv. to $HNO_3$ lost |
|---|---|---|---|---|
| Platinized platinum | None | $O_2$ | 30 | 4.2 |
|  | do | Air | 30 | 2.1 |
|  | 1% tridecylalcohol-ethylene oxide adduct, mole ratio 1:9. | Air | 20 | 7.0 |
| Porous carbon (Pt-Au impregnated). | None | $O_2$ | 30 | 4.0 |
|  | do | Air | 30 | 2.2 |
|  | 1% tridecylalcohol-ethylene oxide adduct, mole ratio 1:9. | $O_2$ | 30 | 10.5 |

It will be noted that these results show an increase in regeneration efficiency by a factor of 3.3 with air with the platinum electrode and 2.6 with oxygen with the carbon electrode when the surfactant was employed. The electrolyte solution was covered with a thick foam layer during the entire run when the surfactant was employed and the escape of $NO_2$ could not be detected by visual observation.

EXAMPLE 2

The effect of nonionic and anionic surfactants on fuel cell oxidant regeneration was tested in accordance with the methods hereinbefore described. The electrolyte employed was 29 wt. percent preelectrolyzed sulfuric acid. The anodes were smooth platinum baskets having dimensions of 2 inches by 3 inches. The cathodes were platinized baskets having dimensions of ½ inch by 1¼ inches. Cathodes of non diffusional, porous carbon impregnated with Pt and Au were also used. The primary oxidant was introduced to the electrolyte in the form of about 70% nitric acid. Total nitric acid content of the electrolyte was 1 wt. percent. An electrolyte temperature of about 180° F. was maintained during the tests. The surfactant was added directly to the electrolyte. The HLB number (hydrophilic-lipophilic balance-number) was determined by dividing by five the amount in wt. percent of ethylene oxide in the nonionic surfactant. The results of these tests are set forth in the following table:

What is claimed is:

1. In a method of regenerating nitric acid from its gaseous reduction products, said nitric acid being the primary oxidant of a fuel cell, said cell containing a catholyte compartment, said compartment containing an aqueous acidic catholyte, the improvement comprising providing a stable collapsible foam regeneration zone consisting of catholyte and a water soluble foaming agent and contacting said zone with free oxygen gas and said gaseous reduction products.

2. A method as defined by claim 1 wherein said water soluble foaming agent is nonionic.

3. A method as defined by claim 1 wherein said water soluble foaming agent is an ethylene oxide adduct of a high molecular weight fatty alcohol.

TABLE I

| Surfactant | HLB No. | Wt. percent used | Secondary oxidant | Flow rate, cc./min. | Electrode used | Regeneration efficiency: coulombs meas./ coulombs equiv. to HNO$_3$ lost |
|---|---|---|---|---|---|---|
| None (For comparison) | | | O$_2$ | 30 | Plat. Pt | 4.2 |
| | | | Air | 30 | Plat. Pt | 2.1 |
| Sodium dodecylated oxydibenzene disulfonate | | 1.0 | O$_2$ | 30 | Plat. Pt | 10.2 |
| | | 0.5 | Air | 40 | Plat. Pt | 3.9 |
| Monophosphate ester of polyoxyethylene ether of tridecylalcohol with 10-11 oxyethylene units. | | 0.5 | O$_2$ | 30 | Plat. Pt | 7.6 |
| | | 1.0 | O$_2$ | 40 | Plat. Pt | 10.5 |
| | | 1.0 | O$_2$ | 50 | Plat. Pt | 8.3 |
| | | 1.0 | Air | 40 | Plat. Pt | 4.2 |
| | | 1.0 | Air | 40 | Plat. Pt | 3.9 |
| Polyoxyethylene ether of tridecylalcohol with 9 oxyethylene units. | 13.3 | 1.0 | O$_2$ | 30 | Porous carbon | 10.5 |
| | | 0.2 | Air | 50 | do | 3.0 |
| | | 1.0 | Air | 20 | Plat. Pt | 7.0 |
| | | 0.1 | Air | 40 | Plat. Pt | 3.4 |
| | | 2.0 | Air | 30 | Plat. Pt | 4.4 |
| Polyoxyethylene ether of tridecylalcohol with 12 oxyethylene units. | 14.5 | 1.0 | Air | 30 | Plat. Pt | 2.5 |
| Polyoxyethylene ether of tridecylalcohol with 15 oxyethylene units. | 15.3 | 1.0 | Air | 30 | Plat. Pt | 1.9 |
| | | 1.0 | Air | 40 | Porous carbon | 3.5 |
| Sodium nonyl oxydibenzene disulfonate | | 1.0 | O$_2$ | 15 | Plat. Pt | 35.2 |
| Fluorocarbon (L-1006) | | 0.02 | O$_2$ | 10 | Plat. Pt | 4.0 |
| Fluorocarbon (FC-95) | | 0.15 | O$_2$ | 30 | Plat. Pt | 3.9 |
| Sodium dodecylbenzene sulfonate | | 1.0 | Air | 60 | Plat. Pt | 3.7 |
| Polysaccharide | | 1.0 | O$_2$ | 30 | Plat. Pt | 5.7 |
| Polysaccharide 0.5% and monophosphate ester (see above) 1%. | | 0.5+1.0 | O$_2$ | 30 | Plat. Pt | 14.0 |
| | | 1.0+1.0 | Air | 30 | Plat. Pt | 1.9 |

References Cited

UNITED STATES PATENTS

| | | | |
|---|---|---|---|
| 3,117,034 | 1/1964 | Tirrell | 136—86 |
| 3,152,013 | 10/1964 | Juda | 136—86 |
| 3,188,241 | 6/1965 | Weiss et al. | 136—86 |
| 3,234,116 | 2/1966 | Holt et al. | 136—86 X |

ALLEN B. CURTIS, *Primary Examiner.*

WINSTON A. DOUGLAS, *Examiner.*